Figure 1:
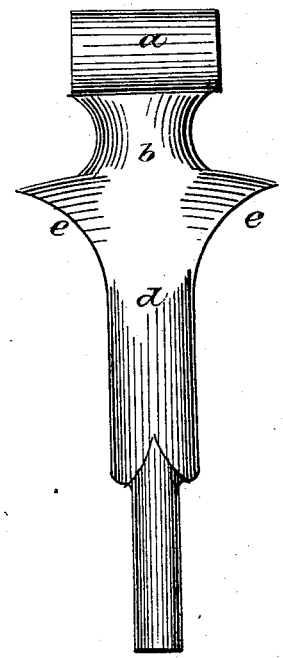
Figure 2:
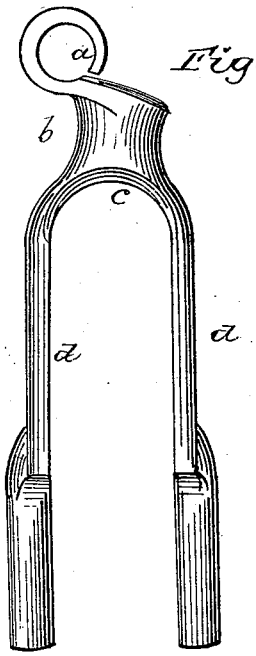

R. R. MILLER.
Jack for Carriage Springs.

No. 100,176.

Patented Feb. 22, 1870.

United States Patent Office.

R. R. MILLER, OF PLANTSVILLE, CONNECTICUT, ASSIGNOR OF HALF INTEREST TO J. B. SAVAGE.

Letters Patent No. 100,176, dated February 22, 1870.

IMPROVEMENT IN JACKS FOR CARRIAGE-SPRINGS.

The Schedule referred to in these Letters Patent and making part of the same.

*To all whom it may concern:*

Be it known that I, R. R. MILLER, of Plantsville, in the county of Hartford, and State of Connecticut, have invented a new and useful Improved Jack for Vehicle Springs; and I do hereby declare the following to be a clear and exact description thereof, sufficient to enable others skilled in the art to which my invention appertains to make and use the same, reference being had to the accompanying drawing, which is a perspective view of my device and forms part of this specification.

The subject of this invention may be regarded as a distinct article of manufacture, it being the design to furnish the same to the market for the convenience of carriage-makers, by whom it is to be employed as a connection between side springs and the bolster or rear axle.

In order that others skilled in the art to which my invention appertains may be enabled to fully understand and use the same, I will proceed to describe it in connection with the accompanying drawing.

The device is formed or cast in one piece. It has an elongated eye, *a*, which, in connection with a buckle or other appliance, is intended to form a joint connection for the end of the side spring of a vehicle. The eye *a* surmounts a neck, *b*, rising from the rest or bearing part *c*, which unites the arms *d d*, which embrace either the bolster or rear axle, and which must, before being applied thereto, have their ends threaded to receive nuts, whereby the device is firmly clamped upon said bolster or axle.

*e e* are wings projecting laterally from the neck *b*, and, being like the bearing part *c* concave on the under side, they have the effect to extend or enlarge the bearing surface, the purpose being to adapt the device to remain more steadily and firmly in true position than the devices heretofore employed for the same purpose.

As before stated, the device may be a special article of manufacture to be put on sale.

The threading of the arms *d d*, and such finishing up as may be needful, can be performed by the coach-makers or others when the device is to be applied to the vehicle.

Having thus described my invention,

What I claim as new, and desire to secure by Letters Patent, is—

A jack or spring-holder having the wings *e e* or an enlarged bearing surface, substantially as and for the purpose described.

The above signed by me this 21st day of January, 1870.

R. R. MILLER.

Witnesses:
H. R. BRADLEY,
O. F. PARSONS.